(12) United States Patent
Lumley

(10) Patent No.: US 7,248,578 B2
(45) Date of Patent: Jul. 24, 2007

(54) NETWORK HUB WITH FUNCTIONALLY INTEGRATED RASTER IMAGE PROCESSOR AND ASSOCIATED PRINTING METHOD AND ARCHITECTURE

(75) Inventor: John William Lumley, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 994 days.

(21) Appl. No.: 10/160,053

(22) Filed: Jun. 4, 2002

(65) Prior Publication Data
US 2002/0181461 A1 Dec. 5, 2002

(30) Foreign Application Priority Data
Jun. 4, 2001 (GB) .................... 0113577.1

(51) Int. Cl.
*H04L 12/56* (2006.01)

(52) U.S. Cl. .................. 370/389; 358/1.15; 370/401

(58) Field of Classification Search ............... 370/389; 358/1.1, 1.14, 1.15
See application file for complete search history.

(56) References Cited

U.S. PATENT DOCUMENTS

| | | | | | |
|---|---|---|---|---|---|
| 5,828,814 | A * | 10/1998 | Cyman et al. | ............... | 358/1.2 |
| 6,236,463 | B1 * | 5/2001 | Cyman et al. | ............. | 358/1.14 |
| 6,493,106 | B1 * | 12/2002 | Gauthier et al. | ........... | 358/1.15 |
| 2003/0184791 | A1 * | 10/2003 | Mitani | ....................... | 358/1.15 |

FOREIGN PATENT DOCUMENTS

EP  1 026 577 A2  8/2000

* cited by examiner

*Primary Examiner*—Brian Nguyen

(57) ABSTRACT

A network hub includes a functionally integrated raster image processor. Such a functionally integrated raster image processor may be used in a network to prioritize the transmission of raster data so that the raster data is received for printing by a print engine such that it can operate synchronously with its demand.

12 Claims, 1 Drawing Sheet

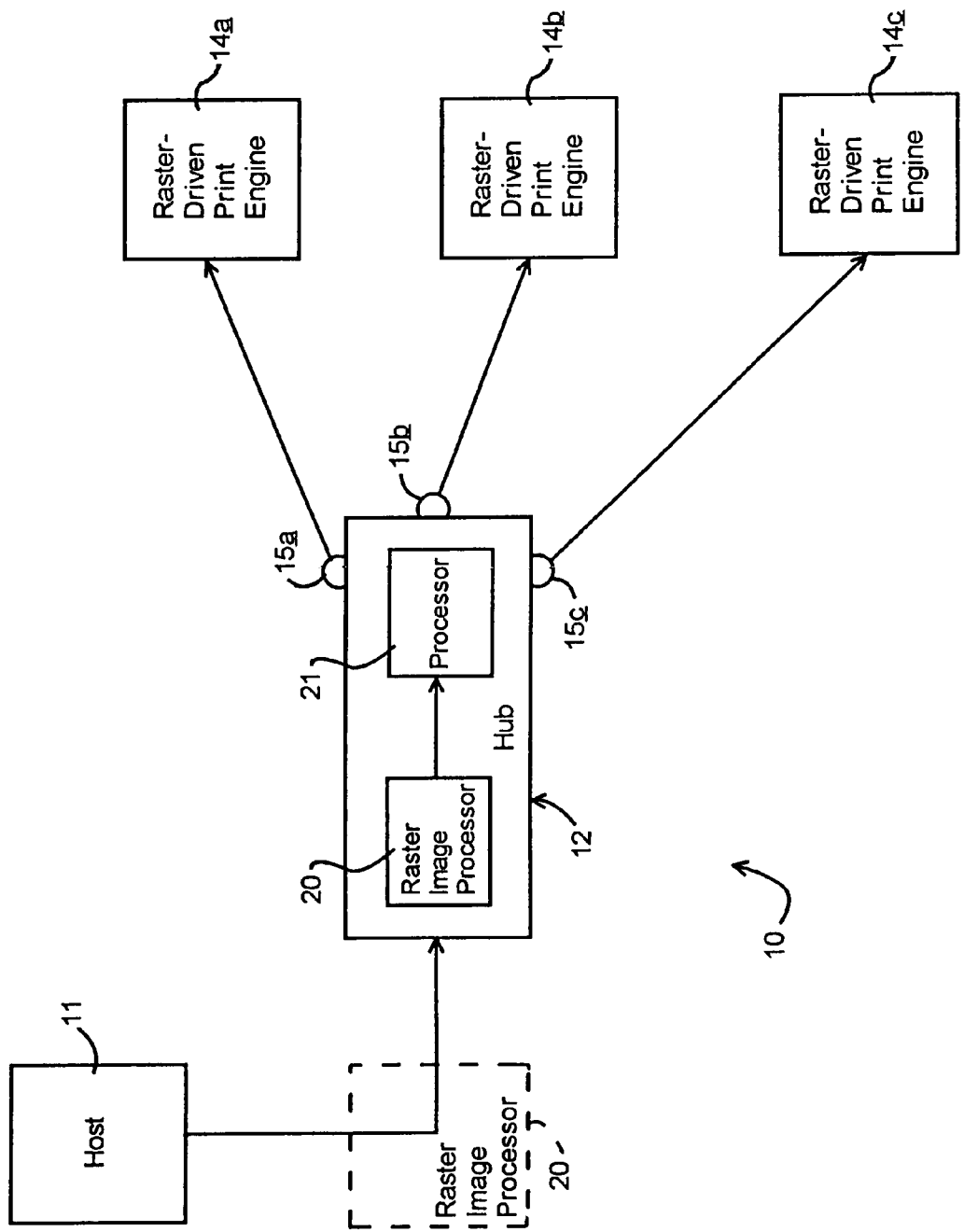

NETWORK HUB WITH FUNCTIONALLY INTEGRATED RASTER IMAGE PROCESSOR AND ASSOCIATED PRINTING METHOD AND ARCHITECTURE

RELATED APPLICATIONS

The present application is based on, and claims priority from, Great Britain Application Number 0113577.1, filed Jun. 4, 2001, the disclosure of which is hereby incorporated by reference herein in its entirety.

DESCRIPTION OF INVENTION

This invention relates to printing methods and apparatus in a network architecture. It also relates to an architecture for a network including raster-driven engines and more particularly but not exclusively to such an architecture having a cluster of raster-driven network print engines.

Networks are known which include one or more hosts which produce data for printing in a page description language. The data is sent from a host via one or more hubs to the raster-driven network print engines. The network print engines each have a raster image processor (RIP) which receives the page description language data and provides pixel maps, i.e. bitmaps, which are reproduced in raster fashion, as images by the print engine.

Such an architecture is typical where the network print engines are laser type printers which require a complete packet of data to be prepared as a bitmap (although this may be in a compressed format which is decompressed as the print engine prints the image) before the print engine is able to be actuated to commence reproduction of the bitmap as an image.

To provide each raster-driven print engine of a cluster of network print engines with its own RIP increases the cost of the individual print engines which is uneconomic particularly where the cluster may include a substantial number of network print engines.

Accordingly it has been proposed to provide a single RIP on a network which is operative to read page description language data for the cluster of raster-driven network print engines, and to provide raster data to each of the network print engines as they require. However because e.g. laser printers and other raster-driven print engines require raster data synchronously, that is complete packets of data to be received (or guaranteed) before printing can be commenced so that the raster driven print engine can be operated synchronously with the raster data being written e.g. to a print engine component, providing the RIP on a network can be problematic because the necessary priority of providing raster data synchronously to the respective print engines of the network cannot be guaranteed, particularly when the network is busy with traffic.

According to one aspect of the invention we provide an architecture for a network including a host, a hub, a plurality of network raster-driven engines connected to the hub, and wherein the hub includes a functionally integrated raster image processor.

By virtue of the invention, each of the raster-driven engines does not require its own RIP, but the disadvantages of providing a RIP for all of the raster-driven engines on the network are avoided, because by providing the RIP functionally integrated with the hub, the RIP can ensure transmission priority of raster data to the network raster-driven engines so that the engines are assured of receiving the raster data synchronously with the demands of the engines. Thus where applied to network printing, the architecture of the invention enables less expensive print engines to be used on the network, and thus an economically advantageous and technically sound solution is provided.

The hub may be an intelligent hub in which some of the ports of the hub are configured to be connected network raster-driven engines, the RIP being positioned and adapted so as to receive data from the host, recognise command data in page description language, to process the page description language data and to ensure the priority of transmission of raster data to appropriately configured ports of the hub to which raster-driven engines are connected, synchronously with the demands of at least one of the raster-driven engines.

It should be noted that "synchronously with the demands of a raster-driven engine" does not require that traffic leaves the hub of the port in an exactly timed relationship with the input to the actual print engine itself. Some memory will generally be provided at the raster-driven engine, sufficient that limited buffering can be achieved by the raster-driven engine. This buffering will generally be limited, as any such buffering leads to a proportionate loss of latency. The requirement on the hub is that the raster data is provided in such a manner that, with the assistance of any buffering provided in the data pipeline from the hub to the input of the print engine itself, raster data is received at the print engine input synchronously with its demands.

Alternatively and preferably, the hub is a switched hub which includes a processing means which reads destination addresses of the network raster-driven engines and other items connected to the ports of the hub, for each packet of data received by the hub, and forwards the packet to the appropriate port to which the addressed raster-driven engine or other network item is connected, the RIP being positioned and adapted so as to receive data from the host in page description language addressed to a particular raster-driven engine, to process the page description language data and to ensure the priority of transmission of raster data to the port of the hub to which the addressed raster-driven engine is connected, synchronously with the demands of the raster-driven engine.

In each case, preferably the RIP is integrally provided within the hub, for example as an integrated hardware or software component of the hub. The RIP may have a memory, which may be dedicated to the RIP or where the hub is intelligent or switched, shared with a memory used for hub functionality, for storing data in page description language and/or as a bitmap and/or as raster data, to ensure that raster data may be transmitted to the or an appropriate raster-driven engine synchronously with the demands of the raster-driven engine.

In each case, where network items are connected to the hub in addition to the network raster-driven engines, the RIP is adapted to give priority to the transmission of raster data to the raster-driven engines synchronously with the demands of at least one of the raster-driven engines, or where the hub is a switched hub, to a specifically addressed raster-driven engine.

The network raster-driven engines may include at least one raster-driven printer such as a laser printer, and/or at least one raster-driven display device. The host may be a network server, or a network terminal such as a PC, or a print spooler device.

According to a second aspect of the invention we provide a method of network printing including providing from a networked host to a raster image processor functionally integrated with a network hub, data in page description language, processing the data with the raster image processor to produce pixel maps which are reproducible as images by a raster-driven print engine, and providing raster data to the raster-driven print engine from the hub synchronously with the demands of the raster-driven engine.

The method of the second aspect of the invention may be used in a network having the architecture of the first aspect of the invention.

According to a third aspect of the invention we provide a network having an architecture according to the first aspect of the invention.

The network may include a hub with an integral raster image processor.

According to a fourth aspect of the invention we provide a hub for a network according to the third aspect of the invention, the hub including an integral raster image processor adapted to produce pixel maps which are reproducible as images by a raster-driven engine connected to a port of the hub, and to provide raster data to the raster-driven engine synchronously with the demands of the raster-driven engine.

The RIP of the hub is preferably adapted to give priority to the transmission of the raster data to the raster-driven engine over the transmission of any other network data received by the hub.

The invention will now be described with reference to the accompanying drawing which is a diagrammatic illustration of part of a network with an architecture in accordance with the invention.

Referring to the drawing there is shown part of a network 10 which includes a host 11, a hub 12, and a cluster of raster-driven print engines, indicated at 14a, 14b, 14c. The network 10 may include other hosts, hubs and raster-driven engines etc.

The host 11 may be a network server, a terminal on the network 11, such as for example a PC, a print spooler device or any other host from which print commands may be generated for one or more of the network print engines 14a, 14b, 14c.

The print engines 14a, 14b, 14c are, in accordance with the invention, of the raster driven-kind, which use raster data to reproduce pixel maps i.e. bitmaps. The bitmaps may be reproduced on a substrate such as paper, in which case at least one of the print engines 14a, 14b, 14c may be a laser type printer. Alternatively the bitmaps may be reproduced for display, in which case at least one of the raster-driven engines 14a, 14b, 14c may be an appropriate raster-driven display device.

The print engines 14a, 14b, 14c are all connected to a respective port 15a, 15b, 15c of the hub 12, via connecting leads, as is well known in the art.

Although in the drawing, the host 11 is shown connected to the hub 12 via a connecting lead, it will be appreciated that the host 11 may send commands to the hub 12 directly as shown, or indirectly over a connection which may include a telecommunications network.

A raster-driven engine such as a laser printer, requires a complete packet of raster data to be prepared before the printer can commence printing. This is because it is necessary to write the image data in raster fashion onto a drum within the laser printer, in synchronism with drum rotation, whilst at the same time, transferring the image data on the drum as an ink image onto a substrate. Thus it is not readily possible to part-write the image data without risking losing the essential synchronism between the raster writing and drum movement and substrate inking.

In order to process the print commands from the host 11 which are in a page description language, into usable raster data, a raster image processor (RIP) is required.

In accordance with the present invention, the hub 12 includes a functionally integrated RIP 20. Preferably the RIP 20 is integral within the hub 12, for example as an integrated hardware or software component of the hub 12.

In the drawings, the hub 12 is a so-called switched hub 12 which includes a processor 21 which reads destination addresses of the network print engines 14a, 14b, 14c as well as any other items connected to the ports 15a, 15b, 15c etc. of the hub 12, for each packet of data received by the hub 12. The processor 21 then forwards the packet to the appropriate port 15a, 15b, 15c to which the addressed print engine 14a, 14b, 14c or other network item is connected.

The RIP 20 is positioned within the hub 12, and is adapted so as to receive image data from the host 11 in page description language addressed to a particular print engine 14a, 14b, or 14c, and to process the page description language data to create a bitmap, and to ensure the priority of transmission of raster data usable by the respective print engine 14a, 14b, 14c synchronously with the demands of the particular print engine which is connected to a port 15a, 15b, 15c of the hub 12, to which the addressed print engine 14a, 14b, 14c is connected.

In this way, the individual print engines 14a, 14b, 14c need not each include their own respective RIPs. Because the RIP 20 is functionally integrated with the hub 12, the RIP 20 is given complete control over the network hub 12, so that the RIP 20 can ensure transmission priority of raster data to the print engines 14a, 14b, 14c, to guarantee that the raster data is supplied synchronously to the print engines 14a, 14b, 14c, i.e. so that the raster image data can be written e.g. to the drum of a laser printer print engine, in synchronism with drum movement, regardless of other traffic which may be active on the network 10.

In order to achieve this synchronism, the RIP 20 needs to be able to control traffic on the network to some extent—in particular, it needs to be able to interrupt other traffic and kill or deprioritise other packets. This is best achieved in different ways for different network protocols. 802.11 networking assigns priorities to traffic, so this can be addressed by assigning the highest priority to raster data. Switchable hubs can achieve a similar effect by denial of service to non-raster traffic. A more complex arrangement is required for contention-based Ethernet, but the skilled person will appreciate how sufficient control can be achieved.

Various modifications may be made to the network 10 architecture described above, without departing from the scope of the invention. For example, the hub 12 need not be a hub 12 of the switched kind in which addressed data is forwarded only to the particular port 15a, 15b, 15c to which the addressed print engine 14a, 14b, 14c is connected, but the hub 12 may be of a simple kind which forwards the same data to all of the ports 15a, 15b, 15c of the hub, or only to certain configured ports of the hub 12, e.g. the ports 15a, 15b, 15c to which print engines 14a, 1b, 14c are connected. In each case though the RIP 20 is positioned integrally within the hub 20, or externally of the hub 20 but still functionally integrated with the hub 12, such as to receive the print command data from the host 11, to process the page description language data and to ensure the priority of transmission of synchronous raster data to a selected, or some appropriately configured, or each of the ports 15a, 15b, 15c of the hub 12 to which the print engines 14a, 14b, 14c are connected.

Where the RIP 20 is provided externally of the hub 12, preferably the RIP 20 is provided in series with the hub 12, for example in the position indicated in the drawings in dotted lines.

The RIP 20 may include a dedicated memory which the RIP 20 may be used to store data in page description language and/or as a bitmap and/or raster format, to facilitate and ensure the synchronous transmission of raster data to the or an appropriate one or ones of the print engines 14*a*, 14*b*, 14*c*.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for the invention in diverse forms thereof.

The invention claimed is:

1. A network hub adapted for routing data to a plurality of raster-driven print engines on a network, the network hub comprising:
   a router for the network for routing packets received from at least one host to an appropriate one of the plurality of raster-driven print engines;
   a raster image processor for (a) receiving page description language data sent from the at least one host, (b) providing raster data from said page description language data and (c) sending the raster data to an appropriate one of the plurality of raster-driven print engines;
   the network hub being arranged to prioritise the transmission of the raster data for enabling the raster data to be received for printing by the appropriate one of the plurality of raster-driven print engines synchronously with demand of the appropriate raster-driven print engine.

2. A network hub as claimed in claim 1, wherein the raster image processor is arranged to recognise command data in the page description language and wherein the raster data comprises pixel maps reproducible as images by the raster-driven print engine.

3. A network hub as claimed in claim 2, wherein the router includes a processor for (a) reading for each packet of data received by the hub destination addresses of the raster-driven print engines connected to a port of the hub, and (b) forwarding said packets to the port to which the addressed raster-driven print engine is connected.

4. A network hub as claimed in claim 1, wherein the router includes a processor for (a) reading, for each packet of data received by the hub, destination addresses of the raster-driven print engines connected to a port of the hub, and (b) forwarding said packets to the port to which the addressed raster-driven print engine is connected.

5. The hub of claim 1 in combination with the plurality of raster-driven print engines.

6. A method of network printing in response to data in page description language from a networked host, the method comprising
   supplying the data in page description language to a raster image processor functionally integrated with a network hub,
   processing the page description language data with the raster image processor to cause raster data to be reproducible as images by a raster-driven print engine,
   providing said raster data to the raster-driven print engine from the hub such that the raster-driven print engine receives said raster data for printing sychronously with its demand,
   further including reading, for each packet of data received by the hub, destination addresses of raster-driven print engines connected to a port of the hub, and
   forwarding with appropriate priority said packets to the port to which the addressed raster-driven print engine is connected.

7. A method of network printing in response to data in page description language from a networked host, the method comprising
   supplying the data in page description language to a raster image processor functionally integrated with a network hub,
   processing the page description language data with the raster image processor to cause raster data to be reproducible as images by a raster-driven print engine,
   said step of processing the page description language data comprising recognizing command data in the page description language and producing the raster data comprising pixel maps reproducible as images by the raster driven print engine,
   providing said raster data to the raster-driven print engine from the hub such that the raster-driven print engine receives said raster data for printing sychronously with its demand,
   reading, for each packet of data received by the hub, destination addresses of raster-driven print engines connected to a port of the hub, and
   forwarding with appropriate priority said packets to the port to which the addressed raster-driven print engine is connected.

8. A network having an architecture including a host, a hub, a plurality of network raster-driven print engines connected to be driven by the hub, and the hub including a functionally integrated raster image processor for driving the plurality of network raster-driven print engines, the hub being an intelligent hub in which some of the ports of the hub are configured to be connected to the network raster-driven print engines, the raster image processor being arranged to (a) receive data from the host, (b) recognize command data in page description language, (c) process the page description language data and (d) ensure the priority of transmission of raster data to appropriately configured ports of the hub to which the raster-driven print engines are connected for causing the raster data to be transmitted to at least one of the raster driven print engines synchronously with the demands of said at least one of the raster-driven print engines.

9. A network according to claim 8 wherein the raster image processor is integral within the hub.

10. A network according to claim 8 wherein the raster image processor is integral within the hub as an integrated hardware or software component of the hub.

11. A network having an architecture including a host, a hub, a plurality of network raster-driven print engines connected to be driven by the hub, the hub including a functionally integrated raster image processor for driving the plurality of network raster-driven print engines, the hub being a switched hub which includes a processor for (a) reading destination addresses of the network raster-driven print engines connected to the ports of the hub, for each packet of data received by the hub, and (b) forwarding the packet to an appropriate port to which the addressed raster-driven print engine is connected, the raster image processor being arranged to (a) receive data from the host in page description language addressed to a particular raster-driven print engine, (b) process the page description language data and (c) ensure the priority of transmission of raster data to the port of the hub to which the addressed raster-driven print engine is connected, synchronously with the demands of the raster-driven print engine.

12. A hub for a network having an architecture including (a) a host, (b) a hub, and (c) a plurality of network raster-driven print engines connected to the hub, the hub including: a functionally integrated raster image processor for (a) producing from data in page description language, pixel maps which are reproducible as images by the raster-driven print engine connected to a port of the hub, and (b) providing raster data to the raster-driven print engine synchronously with the demands of the print engine, the raster image processor of the hub being arranged to give priority to the transmission of the raster data to the raster-driven print engine, over the transmission of any other network data received by the hub.

* * * * *